R. GOLPHIN.
AUTOMOBILE TIRE CHAIN.
APPLICATION FILED SEPT. 27, 1920.
1,412,859. Patented Apr. 18, 1922.
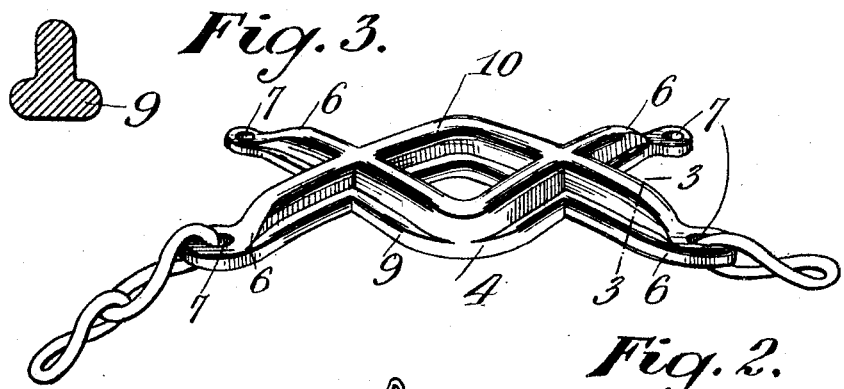
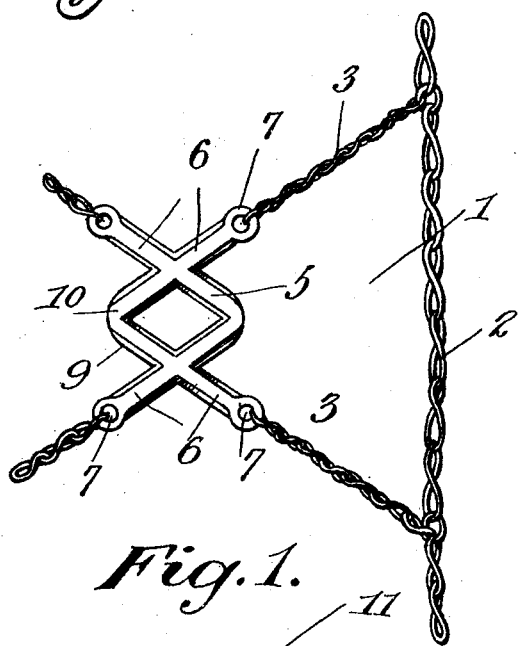
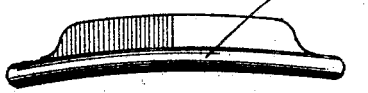
Inventor:
Robert Golphin
By William Clinton
Attorney

UNITED STATES PATENT OFFICE.

ROBERT GOLPHIN, OF BROWNSBURG, QUEBEC, CANADA.

AUTOMOBILE TIRE CHAIN.

1,412,859.  Specification of Letters Patent.  Patented Apr. 18, 1922.

Application filed September 27, 1920. Serial No. 413,076.

*To all whom it may concern:*

Be it known that I, ROBERT GOLPHIN, a subject of the King of Great Britain, residing at Brownsburg, Province of Quebec, Canada, have invented certain new and useful Improvements in Automobile Tire Chains; and I do hereby declare that the following is a full, clear, and exact description of the invention, such as will enable others skilled in the art to which it appertains to make and use the same.

The present invention relates to new and useful improvements in tread elements for tire chains.

The primary object of the invention is the provision of a tire chain for automobile tires and the like having novel connecting links which serve as tread devices to provide a gripping surface for the tire and likewise to prevent skidding.

A further object of the invention is the provision of a tread element for tire chains for automobiles and the like, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawing forming a part of the present invention; and in which, Figure 1 is a fragmentary plan view of a portion of a chain constructed in accordance with the present invention, showing one of the side chains applied.

Figure 2 is a detail perspective view of a portion of one of the links showing the tread member;

Figure 3 is a cross-section taken on the line 3—3 of Figure 2; and,

Figure 4 is a side view thereof.

Referring now to the accompanying drawing by corresponding characters of reference throughout the several views, the numeral 1 designates in general a tire chain constructed in accordance with the present invention, including a side chain 2 and means for connecting a side chain to opposite sides connected at points throughout the chain length by the elements 3. These elements 3 each include a tread member 4 comprising a substantially rectangular open body portion 5 from the ends of which extend arms 6. These arms are provided with terminal eyes 7 to which chains 3 are attached and which connect the tread members 4 to the side chains 2, as clearly illustrated in Figure 1 of the drawing.

The tread members 4 are composed of flat casted strips of material 9 having ribs 10 on their outer faces for engagement with the ground to provide a gripping surface for the tire and also prevent the same from skidding.

The inner sides of the tread members 4 are curved as shown at 11, to conform to the curvature of the outer surface of the tire.

From the foregoing description taken in connection with the accompanying drawing, it will be manifest that a tire chain is provided, which will fulfil all of the necessary requirements of such a device, and it should be understood in this connection, that various minor changes in the specific details of construction can be resorted to within the scope of the appended claim, without departing from the spirit or sacrificing any of the advantages of the invention.

Having thus fully described my invention, what I claim as new and desire to secure by Letters Patent is:

In a tire chain, a tread member including a rectangular open body portion, comprising flat bars of material, arms extending from the ends of said body portion, said arms having terminal eyes formed therein, ribs formed upon the outer surface of the body portion and arms, the inner surface of the tread members being curved to conform with the curvature of a tire, and means for securing the same to the tread surface of a tire.

In witness whereof I have hereunto set my hand.

ROBERT GOLPHIN.